Nov. 6, 1962   G. X. R. BOUSSU ET AL   3,062,259
PNEUMATIC TIRE CASINGS
Filed June 17, 1959   2 Sheets-Sheet 1
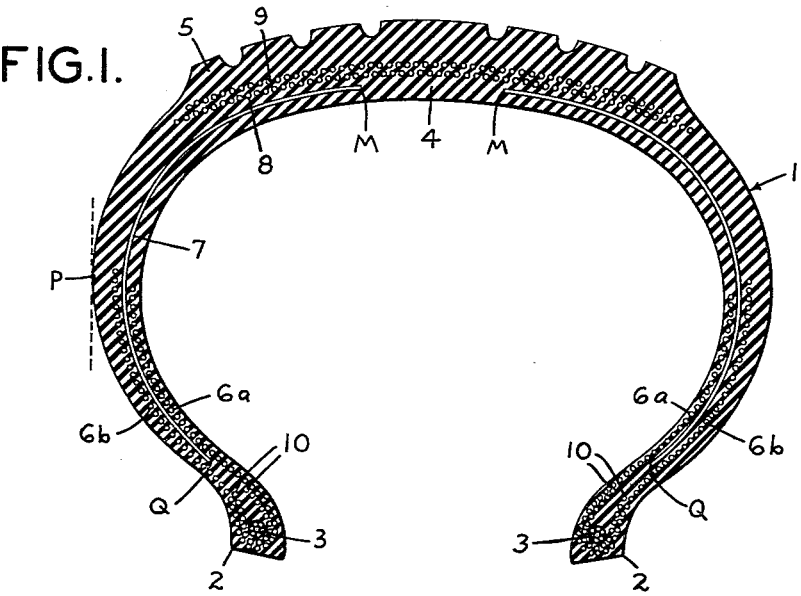
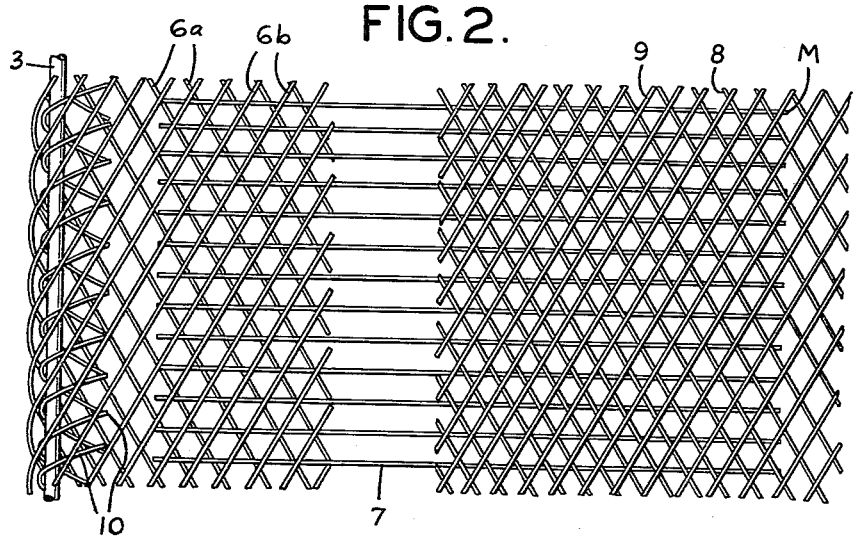
INVENTORS
GABRIEL XAVIER ROGER BOUSSU
LOUIS PIERRE FRANCOIS ANDRE NEUVILLE
LOUIS HENRI NOEL SAINT-FRISON
BY
ATTORNEYS

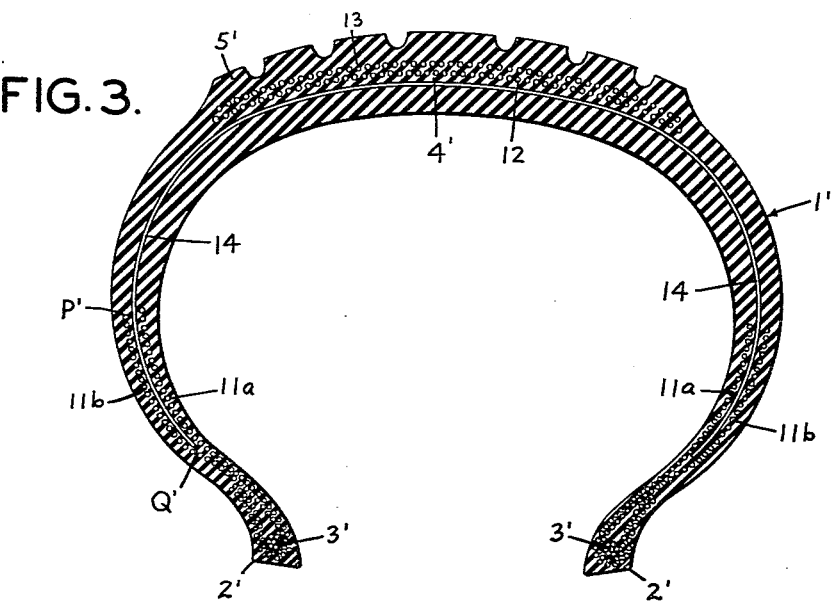
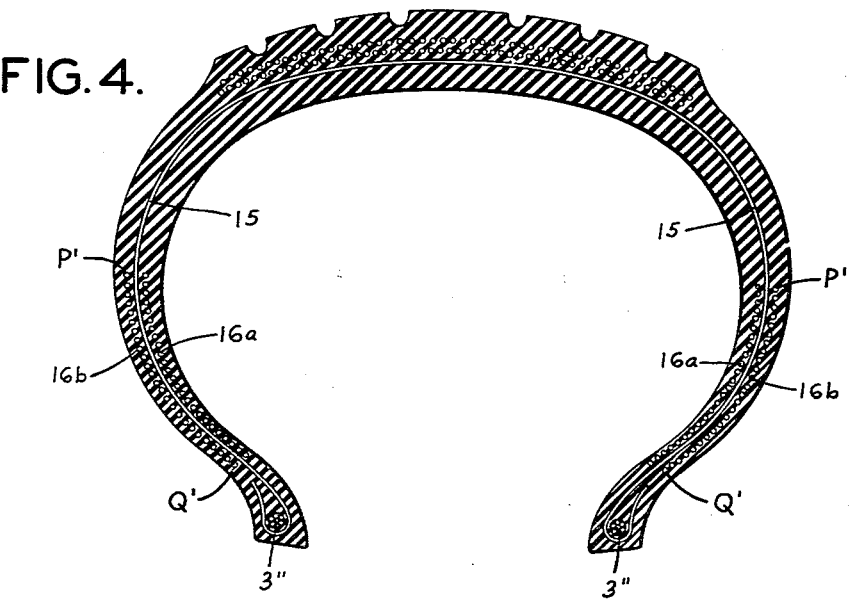

United States Patent Office 3,062,259
Patented Nov. 6, 1962

3,062,259
PNEUMATIC TIRE CASINGS
Gabriel Xavier Roger Boussu, Chamalieres, and Louis Pierre Francois Andre Neuville and Louis Henri Noel Saint-Frison, Clermont-Ferrand, France, assignors to Michelin & Cie, Clermont-Ferrand, France
Filed June 17, 1959, Ser. No. 820,996
Claims priority, application France June 18, 1958
9 Claims. (Cl. 152—356)

This invention relates to pneumatic tire casings for motor vehicles.

Conventional pneumatic tire casings include a carcass of rubber or the like reinforced with cord fabric and having, in cross section, the general shape of an arch with each end thereof terminating in a bead adapted to engage the rim of a vehicle wheel. Each bead is reinforced with a wire or cable. The plies usually extend continuously from one bead to the opposite bead and are wrapped or folded around the wires or cables therein. A tread is bonded to the outermost circumference of the carcass.

In such conventional tire casings the carcass reinforecment comprises superimposed plies each containing parallel cords disposed in crossed or biased relationship to the cords in adjacent plies.

In specially-constructed tire casings of the type disclosed in the Bourdon U.S. Patent No. 2,493,614, the carcass reinforcement includes one or more plies of wires or metal cords extending along the meridian lines of the tire. Several plies of metal cords extending in parallel relation in each ply reinforce the tread zone of the casing. The cords in each ply are oriented in a different direction so as to form a tread reinforcing armature which is highly resistant to deformation.

Conventional tire casings mentioned above have poor road stability. "Road stability" is the ratio of the lateral force required to cause the tire to deviate by a given angle, to the vehicle load applied to the tire. The higher the ratio, the better the road stability. With conventional methods of shaping tires, the inclination of the cords varies from a relatively small angle at the tread area of the tire to a substantially greater inclination adjacent to the beads of the tire. Thus, in a typical tire, the angle of the cords to the circumferentially extending "parallels" is generally greater than 45° in the sidewalls of the tire, but generally not in excess of 35° in the tread zone of the tire.

Due to the crossed relationship between the plies of carcass reinforcement in conventional tires, the cords in the superimposed plies perform scissors-like motions as the wheels rotate, thereby cyclically stretching the rubber in the bottom of the grooves molded in the tire tread, and tending to crack the rubber in said grooves. Further, in those areas where the sides of the tire are subjected to the greater bending stresses, which are the areas extending substantially from the midpoint of the sidewall of the tire to the adjacent edge of the tire tread, the cords of the cross reinforcing plies undergo considerable shear strains, resulting in failures of the reinforcing cords in service.

The special tire casings disclosed in the aforementioned Bourdon U.S. patent are much more stable than the conventional tires due to the reinforcement in the tread zone and the arangement of the plies in the sidewalls of the tire. Nevertheless, it would be desirable to attain even better lateral stability if it were possible to do so without loss of riding comfort.

In accordance with the present invention, tires are provided which have road stability superior to that of tires of the types described above. The improvement in the stability of the new tires arises from our discovery that the stability of the tire casings decreases as the angle of inclination of cords of the reinforcing plies increases with respect to the parallels of the tire, and vice versa.

A tire casing according to the invention has carcass reinforcements which are of different construction and arrangement in the upper area of the sidewalls of the tire, i.e., between the tread edge and the middle of the sidewall of the casing, than in the lower area of the sidewalls, i.e., between the middle of the sidewalls and the beads. In the upper area of the carcass, the reinforcement comprises cords which extend exclusively substantially meridinally of the carcass, whereas in the lower area the reinforcement includes triangulated cords. The term "triangulated" as used in the specification and claims, describes a pattern wherein the parallel cords of three adjacent plies extend in three different directions. The cords of two of the three triangulated cord plies are inclined at a small angle to one parallel of the tire, such as the bead reinforcing wire. An angle of from about 10° to about 40° gives best results. The cords of the third ply are disposed at substantially right angles to said bead wire.

In the lower area of the tire adjacent to the beads the inclined cord plies may either be two separate and distinct strips of cord fabric or they may be formed of a single, wide sheet folded around the bead reinforcing wire or cable to form two plies in which the cords extend at an angle to one another and to the bead wire.

In a preferred embodiment of the invention, the meridian ply serving to reinforce the upper area of the tire sidewall, without any further reinforcement being there provided, is formed of metal cords and extends in a downward direction to a point adjacent the bead, so that it forms also the third ply of the triangulated reinforcement for the lower area of the tire.

Tread reinforcement plies having any desired configuration may be provided in the casing. Thus, the tread area may contain three triangulated metal cord plies as disclosed in U.S. Patent No. 2,493,614, or two metal cord plies coated in a gum composition having a high modulus of elasticity, e.g., not less than about 350 grams per sq. mm. determined on the basis of 100% elongation.

The carcass reinforcing ply of meridinally directed cords may extend continuously from one side of the tire carcass to the other, or it may be interrupted under the tread.

Examples of embodiments of the invention will now be described by way of illustration but not of limitation with reference to the accompanying drawings, in which:

FIGURE 1 is a cross-sectional view of an improved tire casing;

FIGURE 2 is a developed schematic view of the cord arrangement of a portion of one side of the tire casing of FIGURE 1, the spacing between the cords being exaggerated to better illustrate the invention; and FIGURES 3 and 4 are cross-sectional views of two modified tire casing constructions according to the invention.

As shown in FIGURES 1 and 2, a tire casing 1 embodying the invention has beads 2 reinforced with bead wires or cables 3. The carcass 4 of the casing has a tire tread 5 bonded to its top or outermost periphery.

The lower area of each sidewall is reinforced by means of two cord plies 6a and 6b which may be separate and distinct from each other, but, as illustrated, are formed by two edge portions of a single sheet of ply fabric folded around the bead wire 3. The plies 6a and 6b include metal wires, cords or cables (hereinafter referred to as wires) which are crossed in symmetrical relation so that the wires in each ply are disposed at an angle of from about 10° to about 40° to the equatorial line of the tire casing. These plies extend substantially as far as the parallel P located at the midpoint of the tire sidewall, that is, the point of maximum diameter of the tire cross section.

A carcass reinforcing ply 7 formed of wires directed meridianally of the tire casing extends from a parallel Q between the bead wire 3 and the parallel P, to a point M between the edge of the tire tread 5 and the longitudinal median plane or equator of the casing. The ply 7 can have its inner edge disposed inwardly or outwardly of the plies 6a and 6b, but as illustrated, it is disposed between the plies 6a and 6b.

Thus, it will be apparent that there is provided throughout the area PQ of the tire casing a zone of reinforcement that is triangulated in character and thus is highly resistant to deformation.

A flipper 10 is folded around the bead wire 3 in the usual manner to strengthen the bead area and to reduce wear of the bead 2 against the wheel rim.

A tread reinforcement may be provided which desirably, though not necessarily, is of the kind disclosed in the aforementioned Bourdon U.S. patent. In the example shown, the tread reinforcement includes two plies 8 and 9 extending directly under the tire tread 5 over a width equal to that of the tread. These plies may, for example, be made from wires that are symmetrically crossed as from one ply to the next, and form with the equator of the tire casing a relatively small angle not exceeding about 40°.

The modified construction shown in FIGURE 3 is generally similar to that just described, with corresponding parts being designated by corresponding primed reference characters. The important differences of this construction over that of FIGURES 1 and 2 are the following:

(a) The plies 11a and 11b, instead of being formed by the folds of a single layer of wires longitudinally folded around the bead wire 3′, are separate and distinct, each having a small end portion folded around said wire;

(b) The carcass reinforcing ply 14 extends continuously under the tire tread.

In a further modification shown in FIGURE 4, the ply 15 extends downwardly as far as the bead wire 3″ and is folded around the latter to project upwardly therefrom by a length of about 1 or 2 centimeters. The wire plies 16a and 16b are separate. They are not folded around the bead wire but extend from the midpoint P′ to a point Q′ located above the bead.

Various changes can be made in the tires without departing from the invention. Thus, the meridianally disposed cords of the carcass reinforcing plies may be textile cords instead of wires. In that case, the lower crossed reinforcement plies 6a and 6b, 11a and 11b, and 16a and 16b, are further stiffened or triangulated with additional wires which may desirably be arranged to extend along meridians. Moreover, the lower crossed plies 6a and 6b, etc., may be coated with high-modulus rubber to stiffen them.

Accordingly, it will be understood that the invention is not restricted to the embodiments and modifications illustrated and described herein, but should be considered as including various other modifications falling within the scope of the following claims.

We claim:

1. A pneumatic tire having a carcass and a tread thereon, said carcass having a tread-supporting portion, sidewalls on opposite sides of said tread-supporting portion and a bead at the edge of each sidewall, a plurality of metallic plies interposed between said tread-supporting portion and said tread for reinforcing said tread and rendering it resistant to deformation, bead wires in and extending circumferentially of said beads, said carcass comprising a first ply of substantially parallel cords extending from adjacent to each bead at least to an adjacent edge of said tread-supporting portion, the cords in said ply extending meridianally of said carcass, and at least two additional plies of wires in each sidewall and extending from about the middle of the sidewall to about the bead thereon, one of said additional plies having substantially parallel wires therein inclined to the equator of said carcass and crossing the cords of said first ply, and another of said additional plies having substantially parallel wires therein crossing the cords of said first ply and the wires of said one additional ply and being inclined with respect to the equator of said carcass, at least one of said first and said additional plies in said sidewalls overlapping the bead wire in the corresponding bead.

2. The tire set forth in claim 1 in which said one and said another additional plies overlap the bead wires in said beads.

3. The tire set forth in claim 2 in which said first ply terminates in said sidewalls adjacent to said beads.

4. The tire set forth in claim 1 in which said first ply extends completely across said tread-supporting portion of said carcass.

5. The tire set forth in claim 4 in which said first ply extends into both beads and overlaps the bead wires therein.

6. A pneumatic tire casing having a carcass and a tread thereon, said carcass having sidewalls, a tread supporting portion between said sidewalls and beads at outer edges of said sidewalls, a plurality of plies of metallic cables interposed between said tread-supporting portion and said tread for reinforcing said tread and rendering it resistant to deformation, bead wires in and extending circumferentially of said beads, said carcass comprising a first ply of substantially parallel cords in each sidewall and extending substantially meridianally of said carcass from adjacent to the bead thereon at least to the edge of said tread-supporting portion, two additional plies of metallic wires embedded in each sidewall and disposed in and limited to a zone between about the middle of said sidewall and the bead thereon, the wires in each of said two plies being parallel, the wires in one of said additional plies being inclined to the equator of said carcass, the wires in the other of said two plies being inclined to the equator of said carcass and crossing the wires in said one additional ply and overlapping the bead wire.

7. The tire casing set forth in claim 6 in which the cords of all plies are made of wires.

8. The tire casing set forth in claim 6 in which said first ply terminates in said sidewall outside of said bead.

9. The tire casing set forth in claim 8 in which said two plies are portions of a folded, single ply, the folded ply having its fold located within said bead and extending around said bead wire therein.

References Cited in the file of this patent

UNITED STATES PATENTS

| | | |
|---|---|---|
| 2,186,178 | Shoemaker | Jan. 9, 1940 |
| 2,501,372 | Benson | Mar. 21, 1950 |

FOREIGN PATENTS

| | | |
|---|---|---|
| 467 | Great Britain | of 1913 |
| 730,878 | Great Britain | June 1, 1955 |
| 765,550 | Great Britain | Jan. 9, 1957 |